United States Patent
Li et al.

(10) Patent No.: US 11,252,872 B2
(45) Date of Patent: Feb. 22, 2022

(54) CLEANING DEVICE FOR EVEN MATERIAL DISTRIBUTION VIA SHAKING AND HARVESTER EQUIPPED THEREWITH

(71) Applicant: JIANGSU UNIVERSITY, Zhenjiang (CN)

(72) Inventors: Qinglin Li, Zhenjiang (CN); Chengjian Yao, Zhenjiang (CN); Hanping Mao, Zhenjiang (CN); Yunlin Huang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/281,575

(22) PCT Filed: Mar. 29, 2019

(86) PCT No.: PCT/CN2019/080285
§ 371 (c)(1),
(2) Date: Mar. 30, 2021

(87) PCT Pub. No.: WO2020/168613
PCT Pub. Date: Aug. 27, 2020

(65) Prior Publication Data
US 2021/0307253 A1    Oct. 7, 2021

(30) Foreign Application Priority Data
Feb. 20, 2019 (CN) .......................... 201910125534.X

(51) Int. Cl.
*A01F 12/44* (2006.01)
*A01F 12/32* (2006.01)
*A01D 41/12* (2006.01)
*A01D 75/28* (2006.01)
(Continued)

(52) U.S. Cl.
CPC ............ *A01F 12/446* (2013.01); *A01F 12/32* (2013.01); *A01F 12/44* (2013.01); *A01D 41/12* (2013.01);
(Continued)

(58) Field of Classification Search
CPC ........ A01F 12/446; A01F 12/32; A01F 12/44; A01F 12/28; A01F 12/46; A01F 7/06; A01F 12/448; A01D 75/282; A01D 41/12
See application file for complete search history.

(56) References Cited

U.S. PATENT DOCUMENTS

| | | | | |
|---|---|---|---|---|
| 3,757,797 | A | * | 9/1973 | Mathews ................ A01F 12/34 460/91 |
| 10,080,329 | B2 | * | 9/2018 | Reinecke .............. A01F 12/448 |
| 10,334,781 | B2 | * | 7/2019 | Reinecke .............. A01F 12/448 |

(Continued)

FOREIGN PATENT DOCUMENTS

CN     1198874 A     11/1998
CN    203302024 U    11/2013
(Continued)

*Primary Examiner* — Arpad Fabian-Kovacs
(74) *Attorney, Agent, or Firm* — Bayramoglu Law Offices LLC

(57) ABSTRACT

A cleaning device includes a first frame plate, a shaking plate, a second frame plate, a sieve body, a driving mechanism, a throwing rod, and a crank and connecting rod mechanism. The shaking plate is mounted in the first frame plate, forms an angle of inclination with a horizontal plane, and is connected to a shaking device. The second frame plate is mounted below the first frame plate, and is connected to the first frame plate through a crank mechanism. The sieve body is mounted in the second frame plate. The driving mechanism is connected to the shaking device and the second frame plate, and configured for driving the shaking device to cause the shaking plate to shake and driving the second frame plate to cause the sieve body to perform a (Continued)

sieving motion. A harvester including the cleaning device is further provided.

15 Claims, 6 Drawing Sheets

(51) Int. Cl.
    *A01F 7/06*           (2006.01)
    *A01F 12/28*         (2006.01)
    *A01F 12/46*         (2006.01)

(52) U.S. Cl.
    CPC .............. *A01D 75/282* (2013.01); *A01F 7/06* (2013.01); *A01F 12/28* (2013.01); *A01F 12/448* (2013.01); *A01F 12/46* (2013.01)

(56) References Cited

U.S. PATENT DOCUMENTS

| | | | | |
|---|---|---|---|---|
| 2005/0282601 | A1* | 12/2005 | Duquesne | A01F 12/448 460/101 |
| 2008/0318650 | A1* | 12/2008 | Dhont | A01F 12/32 460/101 |
| 2014/0171163 | A1* | 6/2014 | Murray | A01F 12/448 460/101 |
| 2014/0179381 | A1* | 6/2014 | Murray | A01D 75/282 460/101 |
| 2015/0080070 | A1* | 3/2015 | Johnson | A01D 75/282 460/5 |
| 2016/0029562 | A1* | 2/2016 | De Smet | A01F 12/448 460/1 |
| 2017/0020075 | A1* | 1/2017 | Reinecke | A01F 12/446 |
| 2017/0049057 | A1* | 2/2017 | Reinecke | A01D 41/1276 |
| 2019/0387682 | A1* | 12/2019 | Thomas | A01F 12/448 |

FOREIGN PATENT DOCUMENTS

| | | |
|---|---|---|
| CN | 106818066 A | 6/2017 |
| CN | 108738731 A | 11/2018 |
| EP | 3120688 A1 | 1/2017 |
| EP | 3132670 A1 | 2/2017 |

* cited by examiner

CLEANING DEVICE FOR EVEN MATERIAL DISTRIBUTION VIA SHAKING AND HARVESTER EQUIPPED THEREWITH

CROSS REFERENCE TO THE RELATED APPLICATIONS

This application is the national phase entry of International Application No. PCT/CN2019/080285, filed on Mar. 29, 2019, which is based upon and claims priority to Chinese Patent Application No. 201910125534.X, filed on Feb. 20, 2019, the entire contents of which are incorporated herein by reference.

TECHNICAL FIELD

The present invention relates to the research field of cleaning technologies for harvesters, and in particular, to a cleaning device and a harvester equipped with the same.

BACKGROUND

A cleaning device is one of the important working members of a combine harvester. Its main function is to separate grains from impurities through sieving of a sieve box and winnowing of a wind field, so as to obtain clean grains without impurities. A shaking plate is an important part of the cleaning device, and it can collect and deliver materials. At present, the shaking plate of the cleaning device is mainly fixed on or hinged to a rack and moves together with the rack. Although the shaking plate in such a motion has a certain delivery capacity, materials may still pile up on the shaking plate when the cleaning device is working on rice, oilseed rape, and other crops with relatively high humidity, and the materials are not loose enough to give full play to the cleaning effect of the wind field and vibrating sieves, which affects the working performance of the cleaning device.

SUMMARY

To solve the above problem, the present invention provides a cleaning device, wherein two frame plates arranged up and down are designed, a shaking plate connected to a shaking device is arranged on the first frame plate and performs a variable accelerated motion, materials falling on the shaking plate are evenly delivered to a throwing rod and cleaning sieves under the action of an inertial force of the shaking plate, and the evenly distributed materials bring the cleaning effect of the cleaning sieves into full play. The throwing rod is enabled by a crank and connecting rod mechanism to perform a throwing motion in an up-and-down reciprocating manner, which helps to scatter the materials, keep the materials in a wind field for a longer time, and give full play to the cleaning capacity of the wind field.

The present invention further provides a harvester equipped with the cleaning device.

The present invention solves the technical problem by using the following technical solutions: A cleaning device includes:

a first frame plate;

a shaking plate, mounted in the first frame plate, forming an angle of inclination with a horizontal plane, and connected to a shaking device;

a second frame plate, mounted below the first frame plate, and connected to the first frame plate through a crank mechanism;

a sieve body, mounted in the second frame plate; and a driving mechanism, connected to the shaking device and the second frame plate, and configured for driving the shaking device to cause the shaking plate to shake and driving the second frame plate to cause the sieve body to perform a sieving motion.

In the above solution, a throwing rod and a crank and connecting rod mechanism are further included, wherein the throwing rod is mounted in the first frame plate and located below the shaking plate; two ends of the throwing rod are each connected to a third sleeve, the third sleeve is mounted on a bearing in a first bearing pedestal, and the first bearing pedestals are respectively mounted on two sides of the first frame plate;

the crank and connecting rod mechanism is connected to the throwing rod, and the driving mechanism is connected to a power input shaft of the crank and connecting rod mechanism to drive the throwing rod to move.

In the above solution, the shaking device includes a cam mechanism, press plates, first elastic members, and second elastic members, wherein the cam mechanism includes cams and a shaft; the cams are respectively mounted on two ends of the shaft, the two ends of the shaft are each mounted on a first sleeve, the first sleeve is mounted on a first bearing, the first bearing is mounted on a second bearing pedestal, and the second bearing pedestals are respectively mounted on two sides of the first frame plate;

the press plates are respectively arranged on two sides of the shaking plate, the cams and the press plates are arranged at corresponding positions, and the rotation of the cams causes the press plates to be pressed downward, the first elastic members are mounted on a bottom side of the shaking plate, and the second elastic members are each mounted on a bottom side of the press plate.

In the above solution, the crank mechanism includes a first crank, wherein two ends of the first crank are each mounted on a first shaft sleeve, the first shaft sleeves are respectively mounted on a second bearing and a third bearing, the second bearing is mounted on the second frame plate, and the third bearing is mounted on the first frame plate.

In the above solution, the driving mechanism includes a first belt pulley, a second belt pulley, a third belt pulley, a second power input shaft, rocker arms, fourth bearings, and eccentric wheels, wherein the rocker arms are connected to the second frame plate, the fourth bearing is mounted on an inner side of each rocker arm, the eccentric wheel is mounted on an inner side of each fourth bearing, the eccentric wheels are mounted on the power input shaft, and the power input shaft is connected to the first belt pulley;

the second belt pulley is connected to the shaking device;

the third belt pulley is connected to the crank and connecting rod mechanism.

In the above solution, the crank and connecting rod mechanism includes a second crank, a connecting rod, and a rocking bar, wherein one end of the second crank is connected to the first power input shaft, the other end of the second crank is hinged to one end of the connecting rod, the other end of the connecting rod is hinged to one end of the rocking bar, and the other end of the rocking bar is connected to the throwing rod.

Further, the connecting rod is a telescopic connecting rod.

In the above solution, the shaking plate forms an angle of 3°-6° with the horizontal plane.

In the above solution, canvas is mounted between the first frame plate and the second frame plate.

A harvester includes the cleaning device.

Compared with the prior art, the present invention has the following beneficial effects:

1. The shaking plate of the present invention is enabled by the shaking device to perform a variable accelerated motion, materials falling on the shaking plate are evenly delivered to the throwing rod and the cleaning sieves under the action of an inertial force of the shaking plate, and the evenly distributed materials bring the cleaning effect of the cleaning sieves into full play.

2. The throwing rod of the present invention is enabled by the crank and connecting rod mechanism to perform a throwing motion in an up-and-down reciprocating manner, which helps to scatter the materials, keep the materials in a wind field for a longer time, and give full play to the cleaning capacity of the wind field.

3. The harvester equipped with the cleaning device of the present invention solves the problem that materials may easily pile up on a shaking plate of an existing harvester and the materials are not loose enough to give full play to the cleaning effect of the wind field and vibrating sieves. Therefore, the overall working performance is improved.

BRIEF DESCRIPTION OF THE DRAWINGS

The above and/or additional aspects and advantages of the present invention will become obvious and easy to understand from the description of the embodiments with reference to the following drawings.

Figure 1:
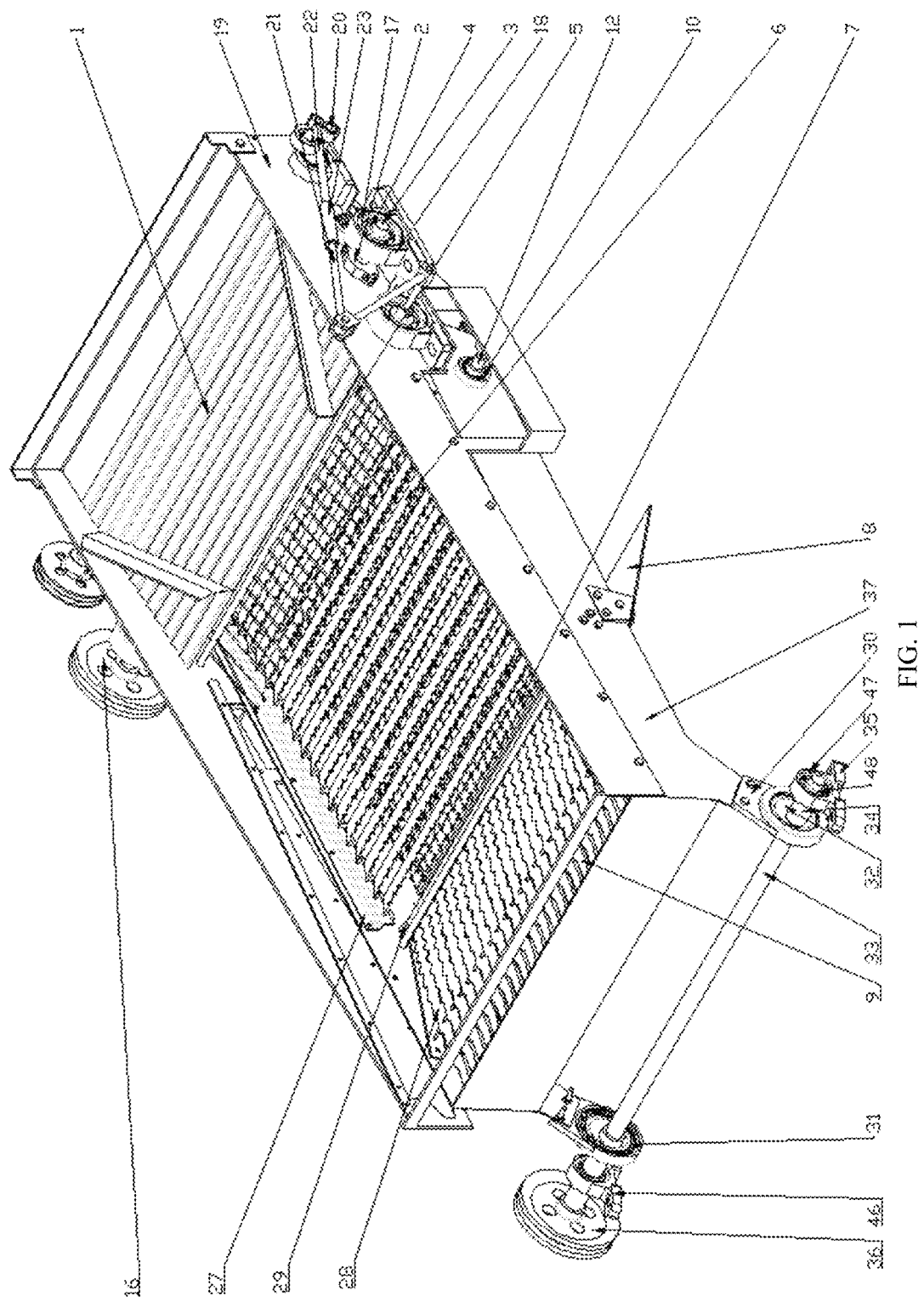
FIG. 1 is a right oblique view of the present invention.

In the drawings: 1. shaking plate; 2. cam; 3. shaft; 4. first sleeve; 5. throwing rod; 6. louver sieve; 7. mesh sieve; 8. grain sliding plate; 9. tail sieve; 10. second bearing; 12. first crank; 13. end cover; 14. press plate; 15. second reset spring; 16. second belt pulley; 17. first bearing; 18. second bearing pedestal; 19. first frame plate; 20. first power input shaft; 21. upper portion of a connecting rod; 22. lower portion of a connecting rod; 23. second shaft sleeve; 24. canvas; 25. upper canvas press plate; 26. lower canvas press plate; 27. louver sieve sheet mounting plate; 28. tail sieve sheet; 29. tail sieve support; 30. rocker arm; 31. fourth bearing; 32. eccentric wheel; 33. second power input shaft; 34. second sleeve; 35. fourth bearing pedestal; 36. first belt pulley; 37. second frame plate; 38. third sleeve; 39. first bearing pedestal; 40. rocking bar; 41. first shaft sleeve; 42. third bearing; 43. first reset spring; 44. second crank; 45. third belt pulley; 46. third bearing pedestal; 47. elastic retaining ring; 48. fourth sleeve.

DETAILED DESCRIPTION OF THE EMBODIMENTS

Embodiments of the present invention are described in detail below and are exemplified in the accompanying drawings, wherein the same or similar reference signs indicate the same or similar elements or elements with the same or similar functions. The embodiments described below with reference to the accompanying drawings are exemplary and are intended to explain the present invention, instead of limiting the present invention.

In the description of the present invention, it should be understood that terms such as "central", "longitudinal", "transverse", "length", "width", "thickness", "upper", "lower", "axial", "radial", "vertical", "horizontal", "inner", and "outer" indicate directional or positional relationships based on the accompanying drawings. They are merely used for the convenience and simplicity of the description of the present invention, instead of indicating or implying that the demonstrated device or element is located in a specific direction or is constructed and operated in a specific direction. Therefore, they cannot be construed as limitations to the present invention. Moreover, terms "first" and "second" are merely used for the purpose of description, and cannot be understood as indicating or implying relative importance or implicitly indicating the number of denoted technical features. Therefore, a feature defined by "first" or "second" explicitly or implicitly includes one or more such features. In the description of the present invention, "a plurality of" means two or above two, unless otherwise expressly defined.

In the present invention, unless otherwise expressly specified and defined, terms such as "mounted", "interconnected", "connected", and "fixed" should be understood in a broad sense. For example, they may be fixed connections, detachable connections, or integral connections; may be mechanical connections or electrical connections; may be direct connections or indirect connections through an intermediate medium; and may be internal communications between two elements. The specific meanings of the above terms in the present invention can be understood by persons of ordinary skill in the art according to specific situations.

Embodiment 1

Figure 2:
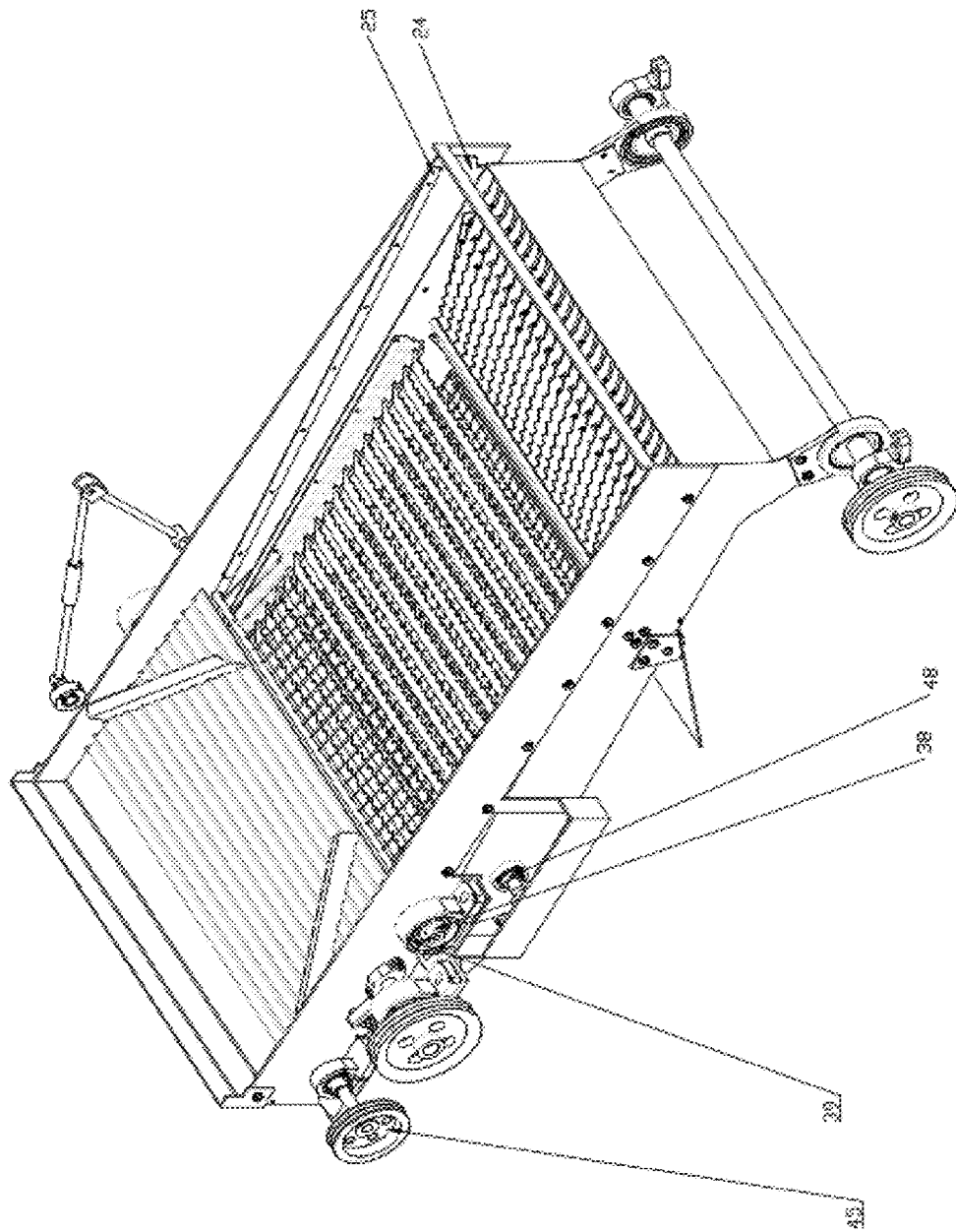
FIG. 2 is a left oblique view of the present invention.
Figure 3:
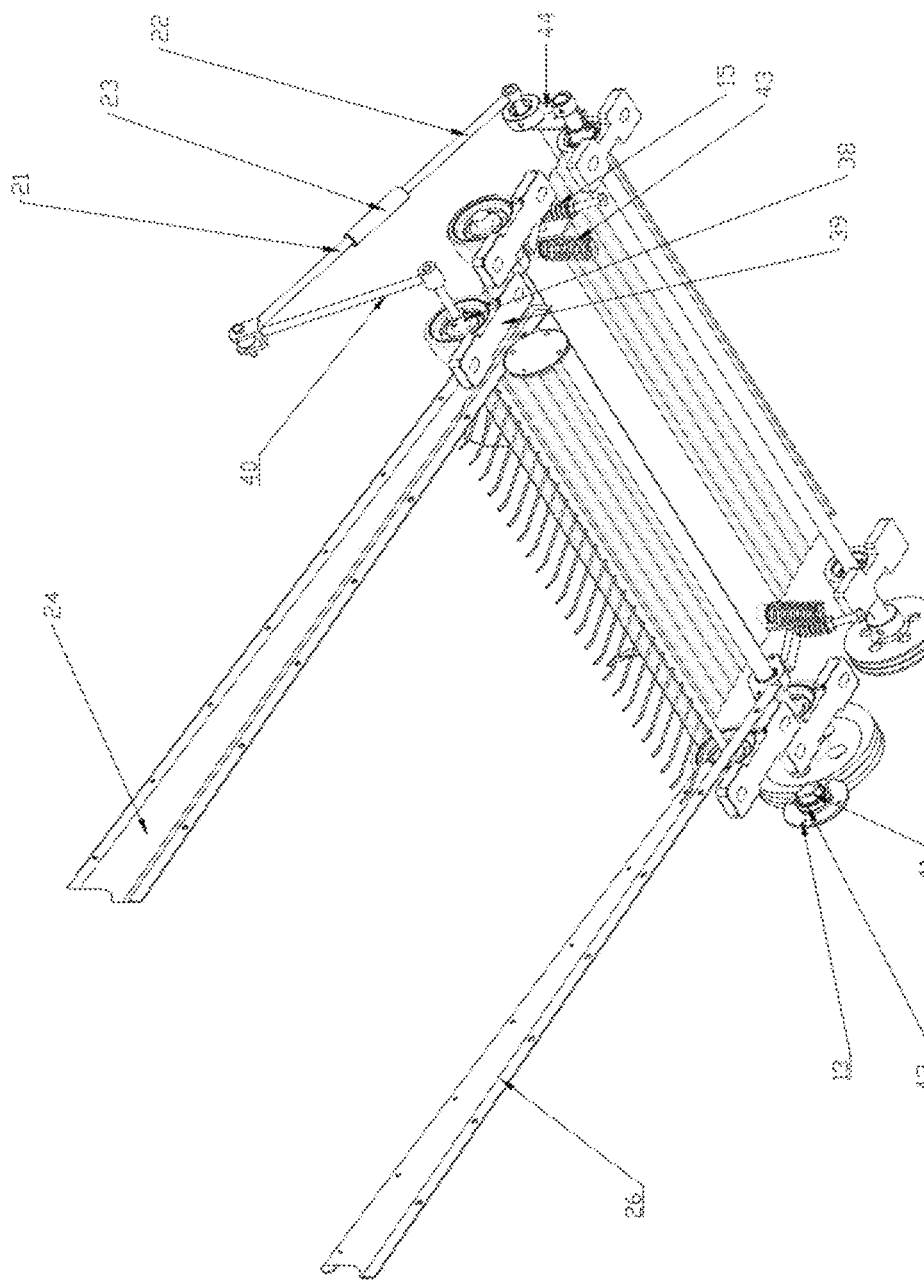
FIG. 3 is an isometric view of the present invention without a first frame plate.
Figure 4:
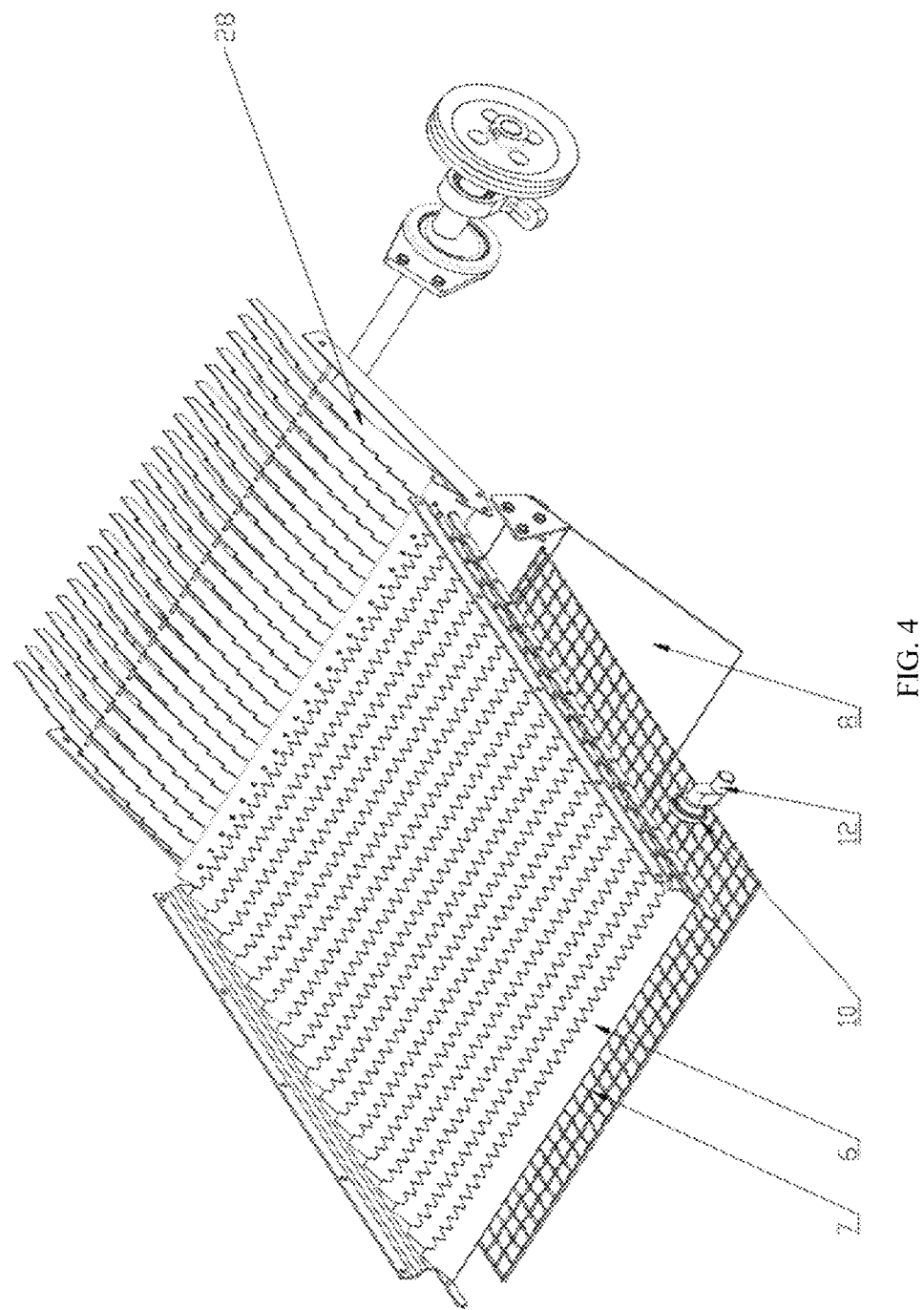
FIG. 4 is an isometric view of the present invention without a second frame plate.
Figure 5:
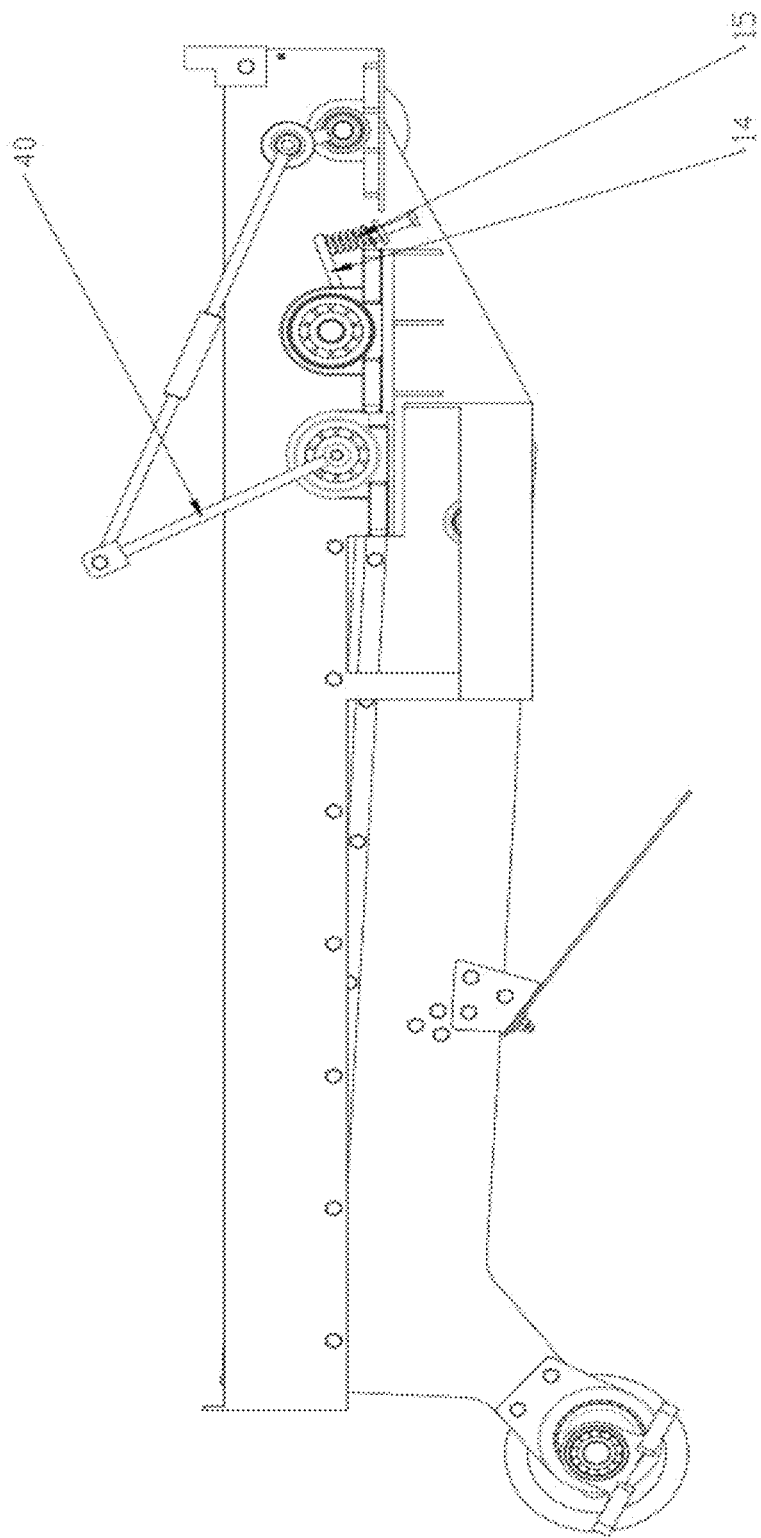
FIG. 5 is a right view.
Figure 6:
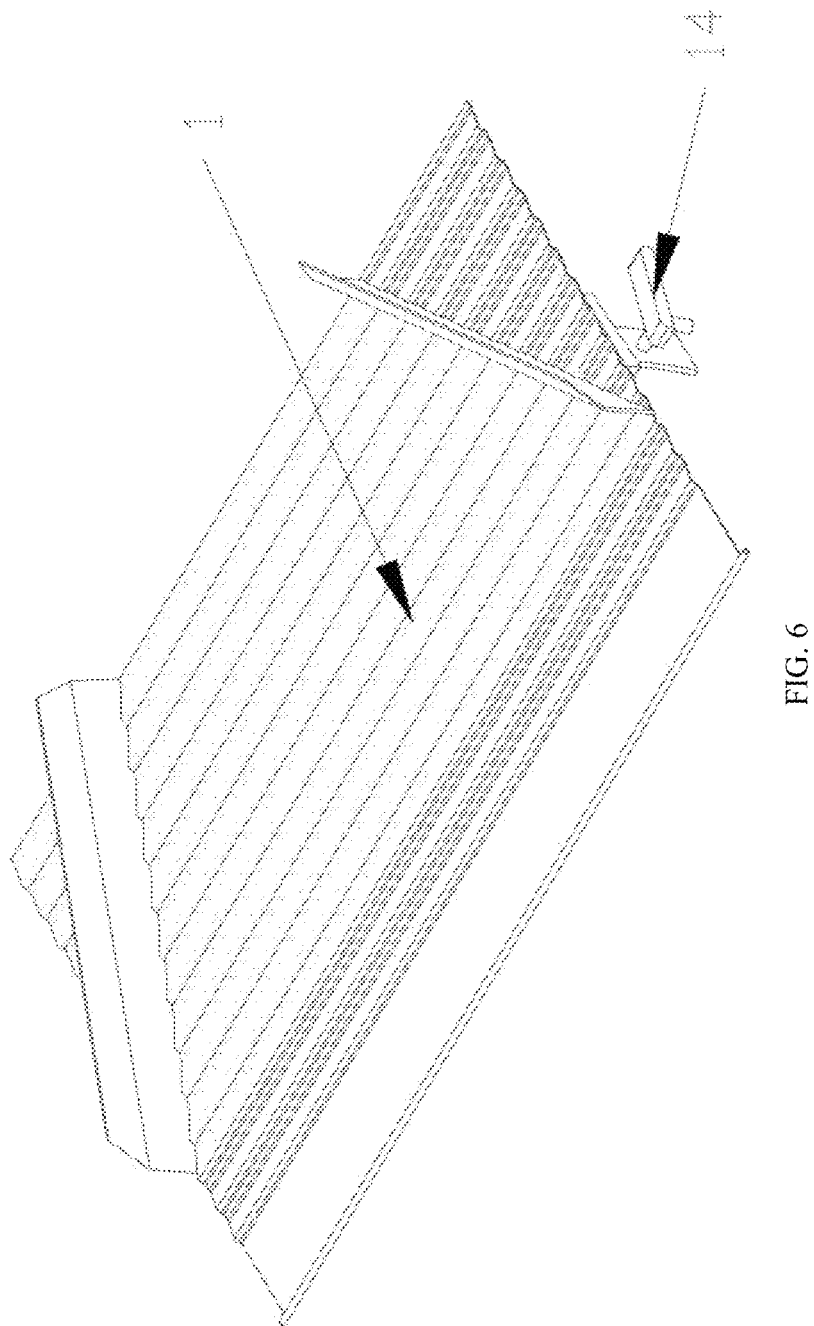
FIG. 6 is an isometric view of a shaking plate.

FIG. 1 and FIG. 2 show an embodiment of a cleaning device according to the present invention. The cleaning device includes a first frame plate 19, a shaking plate 1, a second frame plate 37, a sieve body, a driving mechanism, a throwing rod 5, and a crank and connecting rod mechanism.

The shaking plate 1 is mounted in the first frame plate 19, forms an angle of inclination with a horizontal plane, and is connected to a shaking device. The second frame plate 37 is mounted below the first frame plate 19, and is connected to the first frame plate 19 through a crank mechanism. The sieve body is mounted in the second frame plate 37. The driving mechanism is connected to the shaking device and the second frame plate 37, and configured for driving the shaking device to cause the shaking plate 1 to shake and driving the second frame plate 37 to cause the sieve body to perform a sieving motion.

Preferably, the shaking device includes a cam mechanism, press plates 14, first elastic members, and second elastic members. The cam mechanism includes cams 2 and a shaft 3. The cams 2 are respectively mounted on two ends of the shaft 3, the two ends of the shaft 3 are each mounted on a first sleeve 4, the first sleeve 4 is mounted on a first bearing 17, the first bearing 17 is mounted on a second bearing pedestal 18, and the second bearing pedestals 18 are respectively mounted on two sides of the first frame plate 19. The press plates 14 are respectively arranged on two sides of the shaking plate 1, the cams 2 and the press plates 14 are arranged at corresponding positions, and the rotation of the cams 2 causes the press plates 14 to be pressed downward, the first elastic members are mounted on a bottom side of the shaking plate 1, and the second elastic members are each mounted on a bottom side of the press plate 14. Specifically, the first elastic member is a first reset spring 43, and the second elastic member is a second reset spring 15.

During normal operation of the cleaning device, the first frame plate 19 on an upper portion of the device is fixed on a rack without moving. A front end of the shaking plate 1 is hinged to the first frame plate 19, and the shaking plate 1 in idle forms an angle of 3°-6° with the horizontal plane. One second reset spring 15 is provided below each of the press plates 14 that is arranged on a respective one of two sides of the shaking plate 1. The cam mechanism is driven by a second belt pulley 16, the second belt pulley 16 forces the shaft 3 to rotate, the cams 2 are mounted on the shaft 3 through keyed joint, the axial displacement of each cam 2 is limited by a shaft shoulder and an elastic retaining ring that are respectively arranged on two sides of the cam 2, the shaft 3 is fixed on the first sleeve 4 by screws, the first sleeve 4 is interference-fitted on the first bearing 17, the first bearing 17 is mounted on the second bearing pedestal 18, and the second bearing pedestal 18 is connected to the first frame plate 19 by bolts. The shaft 3 forces the cams 2 to rotate, the cams 2 press downward the press plates 14 on two sides of the shaking plate 1 till the press plates 14 no longer contact the cams 2, and then the shaking plate 1 returns to its original position under the action of the second reset springs 15 and the first reset springs 43. The shaking plate 1 is enabled by the two groups of reset springs and the cams 2 to perform a variable accelerated motion. Materials fall from a threshing device onto the shaking plate 1 and become evenly distributed under the action of an inertial force of the shaking plate 1, and are delivered to the throwing rod 5 in front of the shaking plate 1.

The throwing rod 5 is mounted in the first frame plate 19 and located below the shaking plate 1. Two ends of the throwing rod 5 are each connected to a third sleeve 38, the third sleeve 38 is mounted on a bearing in a first bearing pedestal 39, and the first bearing pedestals 39 are respectively mounted on two sides of the first frame plate 19. The crank and connecting rod mechanism is connected to the throwing rod 5, and the driving mechanism is connected to a power input shaft of the crank and connecting rod mechanism to drive the throwing rod 5 to perform a throwing motion in an up-and-down reciprocating manner.

Preferably, the crank and connecting rod mechanism includes a second crank 44, a connecting rod, and a rocking bar 40. One end of the second crank 44 is connected to the first power input shaft 20, the other end of the second crank 44 is hinged to one end of the connecting rod, the other end of the connecting rod is hinged to one end of the rocking bar 40, and the other end of the rocking bar 40 is connected to the throwing rod 5.

The throwing rod 5 is located at a lower-front position relative to the shaking plate 1, and is preferably away from the shaking plate by 30 mm in a vertical direction. The two ends of the throwing rod 5 are each connected to the third sleeve 38 by screws, the third sleeve 38 is interference-fitted on the bearing in the first bearing pedestal 39, the first bearing pedestal 39 is connected to the first frame plate 19 by bolts, and the throwing rod 5 is driven by the rocking bar 40 of the crank and connecting rod mechanism to perform a throwing motion in an up-and-down reciprocating manner. Preferably, the connecting rod is a telescopic connecting rod, through which the position of the throwing rod 5 is adjustable. Specifically, the connecting rod includes an upper portion of the connecting rod 21, a lower portion of the connecting rod 22, and a second shaft sleeve 23. The upper portion of the connecting rod 21 and the lower portion of the connecting rod 22 are both provided with external threads and are connected through the second shaft sleeve 23 with internal threads, and the length of the connecting rod is adjustable through the threads. One end of the second crank 44 is fixed to the first power input shaft 20, and a lower end of the lower portion of the connecting rod 22 is hinged to the other end of the second crank 44. Throwing teeth are welded on the throwing rod 5, and preferably, the throwing teeth each have a length of 150 mm and are arranged at an interval of 88 mm. During normal operation, materials fall on the shaking plate 1 and are evenly delivered to the throwing teeth under the action of an inertial force of the shaking plate 1. The throwing teeth perform a throwing motion in an up-and-down reciprocating manner to further scatter and throw the materials over a cleaning chamber, so that the materials are kept in a wind field for a longer time and the cleaning performance of the wind field is brought into full play.

The second frame plate 37 is mounted below the first frame plate 19, and is connected to the first frame plate 19 through the crank mechanism. The crank mechanism includes a first crank 12. Specifically, the first crank 12 is a Z-crank. Two ends of the first crank 12 are each mounted on a first shaft sleeve 41, the first shaft sleeves 41 are respectively mounted on a second bearing 10 and a third bearing 42, the second bearing 10 is mounted on the second frame plate 37, and the third bearing 42 is mounted on the first frame plate 19.

Specifically, the second bearing 10 is mounted on a front end of the second frame plate 37, an inner race of the second bearing 10 is interference-fitted with a fourth sleeve 48, the fourth sleeve 48 is fixed on the first crank 12 by screws, the other end of the first crank 12 is fixed on the first shaft sleeve 41 by screws, the first shaft sleeve 41 is interference-fitted on the third bearing 42, the third bearing 42 is mounted on the first frame plate 19, and the axial displacement of the third bearing 42 is limited by an end cover 13.

The driving mechanism includes a first belt pulley 36, a second belt pulley 16, a third belt pulley 45, a second power input shaft 33, rocker arms 30, fourth bearings 31, and eccentric wheels 32. The rocker arms 30 are connected to the second frame plate 37, the fourth bearing 31 is mounted on an inner side of each rocker arm 30, the eccentric wheel 32 is mounted on an inner side of each fourth bearing 31, the eccentric wheels 32 are mounted on the power input shaft 33, the power input shaft 33 is mounted on the rack through a third bearing pedestal 46 and a fourth bearing pedestal 35, and the power input shaft 33 is connected to the first belt pulley 36. The second belt pulley 16 is connected to the shaking device. The third belt pulley 45 is connected to the crank and connecting rod mechanism.

Specifically, the rocker arms 30 are mounted on the second frame plate 37 by bolts, the fourth bearing 31 is mounted on the inner side of each rocker arm 30, the eccentric wheel 32 is mounted on an inner race of each fourth bearing 31, the eccentric wheel 32 is interference-fitted with the inner race of the fourth bearing 31, the eccentric wheel 32 is mounted on the power input shaft 33 through keyed joint, and the axial displacement of the eccentric wheel 32 is limited by a shaft shoulder and a sleeve 34 that are respectively arranged on two sides of the eccentric wheel 32. The other side of the second sleeve 34 is connected to an inner race of a bearing in a fourth bearing pedestal 35, and the axial displacement of the fourth bearing pedestal 35 is limited by an elastic retaining ring 47 arranged on the other side of the bearing. The eccentric wheels 32 and the first crank 12 form a double-crank mechanism.

The second frame plate 37 is mounted with a louver sieve 6. Preferably, an upper end of a louver sieve sheet mounting plate 27 is 12 mm away from the top of the second frame plate 37, and each sheet of the louver sieve 6 forms an angle of 10°-20° with the horizontal plane. A tail sieve 9 is mounted behind the louver sieve 6. Preferably, the tail sieve 9 includes 23 tail sieve sheets 28 and a tail sieve support 29, and the tail sieve sheets 28 are fixed on the tail sieve support 29 by bolts. A mesh sieve 7 is mounted below the louver sieve 6. Preferably, the mesh sieve 7 is 81 mm away from the louver sieve 6, and the mesh size is 10 mm× 10 mm. A grain sliding plate 8 is mounted below the mesh sieve 7.

Canvas 24 is mounted between the first frame plate 19 and the second frame plate 37. Specifically, multiple holes are provided on a lower portion of the first frame plate 19, the diameter of each hole is 6 mm, and the distance between every two holes is 150 mm. Multiple holes are provided on an upper portion of the second frame plate 37, the distance between every two holes is 160 mm, and the diameter of each hole is 8 mm. An upper end of the canvas 24 is fixed by an upper canvas press plate 25 and a lower end of the canvas 24 is fixed by a lower canvas press plate 26. The canvas can prevent the materials from falling outside the cleaning device to cause unnecessary losses.

The specific implementation of the cleaning device of the present invention during harvesting is described as follows. Materials fall from a threshing cylinder onto the shaking plate 1. The shaking plate 1 is enabled by the cam mechanism and the two groups of reset springs to scatter and deliver the materials to the throwing rod 5 behind the shaking plate 1. The throwing rod 5 is forced by the rocking bar 40 of the crank and connecting rod mechanism to perform a throwing motion in an up-and-down reciprocating manner, to further scatter and throw the materials over the cleaning sieves, so that the cleaning effect of the wind field is brought into full play. After the materials are cleaned by the wind field, heavy grains and impurities fall on the cleaning sieves on a lower portion of the cleaning device and are further cleaned, while light impurities are blown out of the cleaning chamber. The motion of the second frame plate 37 can be simplified into the motion of the double-crank mechanism which is forced by the first belt pulley 36 to enable a sieving motion in a back-and-forth reciprocating manner. Large impurities are delivered by the louver sieve 6 and the tail sieve 9 out of the cleaning chamber, grains fall along the grain sliding plate onto a grain auger conveyor and are delivered into a grain tank, and the unsatisfactory materials fall below the tail sieve sheets 28 and are delivered by a secondary cleaning auger conveyor back to the cleaning device for secondary cleaning.

According to the present invention, in the whole upper portion of the cleaning device, the first frame plate 19 does not move during operation, and materials falling from the threshing device are scattered twice and then thrown over the cleaning chamber by the shaking plate 1 and the throwing rod 5; the whole lower portion of the cleaning device can be simplified into the double-crank mechanism, the first frame plate 19 on the upper portion of the device does not move during operation, and the lower portion of the device performs a sieving motion in an up-and-down reciprocating manner, to sufficiently scatter the materials and give full play to the cleaning effect of the wind field and the vibrating sieves in the cleaning chamber.

Embodiment 2

A harvester includes the cleaning device described in Embodiment 1, and thus has the beneficial effects stated in Embodiment 1, so no further description is made herein.

It should be understood that although this specification is described in accordance with the embodiments, each embodiment does not merely include one independent technical solution. This narrative way of the specification is only for clarity, and persons skilled in the art should regard the specification as a whole. The technical solutions in the embodiments can also be appropriately combined to form other implementations that can be understood by persons skilled in the art.

The above descriptions are merely practical embodiments of the present invention, and are not intended to limit the protection scope of the present invention. Any equivalent embodiments or modifications made without departing from the spirit of the present invention shall fall within the protection scope of the present invention.

What is claimed is:

1. A cleaning device, comprising:
a first frame plate;
a shaking plate, mounted in the first frame plate, forming an angle of inclination with a horizontal plane, and connected to a shaking device;
a second frame plate, mounted below the first frame plate, and connected to the first frame plate through a crank mechanism;
a sieve body, mounted in the second frame plate;
a driving mechanism, connected to the shaking device and the second frame plate, and configured for driving the shaking device to cause the shaking plate to shake and driving the second frame plate to cause the sieve body to perform a sieving motion, wherein the driving mechanism comprises a first belt pulley, a second belt pulley, a third belt pulley, a second power input shaft, rocker arms, fourth bearings, and eccentric wheels, wherein
the rocker arms are connected to the second frame plate,
the fourth bearing is mounted on an inner side of each rocker arm,
the eccentric wheel is mounted on an inner side of each fourth bearing,
the eccentric wheels are mounted on the second power input shaft, and the second power input shaft is connected to the first belt pulley:
the second belt pulley is connected to the shaking device:
the third belt pulley is connected to the crank and connecting rod mechanism;
a throwing rod; and
a crank and connecting rod mechanism;
wherein the throwing rod is mounted in the first frame plate and located below the shaking plate; two ends of the throwing rod are each connected to a third sleeve, the third sleeve is mounted on a bearing in a first bearing pedestal, and the first bearing pedestals are respectively mounted on two sides of the first frame plate;
the crank and connecting rod mechanism is connected to the throwing rod, and the driving mechanism is connected to a first power input shaft of the crank and connecting rod mechanism to drive the throwing rod to move.

2. The cleaning device according to claim 1, wherein the shaking device comprises a cam mechanism, press plates, first elastic members, and second elastic members, wherein
the cam mechanism comprises cams and a shaft;
the cams are respectively mounted on two ends of the shaft, the two ends of the shaft are each mounted on a first sleeve, the first sleeve is mounted on a first bearing, the first bearing is mounted on a second bearing pedestal, the second bearing pedestals are respectively mounted on two sides of the first frame plate;

the press plates are respectively arranged on two sides of the shaking plate, the cams and the press plates are arranged at corresponding positions, a rotation of the cams causes the press plates to be pressed downward, the first elastic members are mounted on a bottom side of the shaking plate, and the second elastic members are each mounted on a bottom side of the press plate.

3. The cleaning device according to claim 1, wherein the crank mechanism comprises a first crank, wherein two ends of the first crank are each mounted on a first shaft sleeve, the first shaft sleeves are respectively mounted on a second bearing and a third bearing, the second bearing is mounted on the second frame plate, and the third bearing is mounted on the first frame plate.

4. The cleaning device according to claim 1, wherein the crank and connecting rod mechanism comprises a second crank, a connecting rod, and a rocking bar, wherein a first end of the second crank is connected to the first power input shaft, a second end of the second crank is hinged to a first end of the connecting rod, a second end of the connecting rod is hinged to a first end of the rocking bar, and a second end of the rocking bar is connected to the throwing rod.

5. The cleaning device according to claim 4, wherein the connecting rod is a telescopic connecting rod.

6. The cleaning device according to claim 1, wherein the shaking plate forms an angle of 3°-6° with the horizontal plane.

7. The cleaning device according to claim 1, wherein a canvas is mounted between the first frame plate and the second frame plate.

8. A harvester, comprising the cleaning device according to claim 1.

9. The harvester according to claim 8, wherein the shaking device comprises a cam mechanism, press plates, first elastic members, and second elastic members, wherein the cam mechanism comprises cams and a shaft;

the cams are respectively mounted on two ends of the shaft, the two ends of the shaft are each mounted on a first sleeve, the first sleeve is mounted on a first bearing, the first bearing is mounted on a second bearing pedestal, the second bearing pedestals are respectively mounted on two sides of the first frame plate;

the press plates are respectively arranged on two sides of the shaking plate, the cams and the press plates are arranged at corresponding positions, a rotation of the cams causes the press plates to be pressed downward, the first elastic members are mounted on a bottom side of the shaking plate, and the second elastic members are each mounted on a bottom side of the press plate.

10. The harvester according to claim 8, wherein the crank mechanism comprises a first crank, wherein two ends of the first crank are each mounted on a first shaft sleeve, the first shaft sleeves are respectively mounted on a second bearing and a third bearing, the second bearing is mounted on the second frame plate, and the third bearing is mounted on the first frame plate.

11. The harvester according to claim 8, wherein the driving mechanism comprises a first belt pulley, a second belt pulley, a third belt pulley, a second power input shaft, rocker arms, fourth bearings, and eccentric wheels, wherein the rocker arms are connected to the second frame plate, the fourth bearing is mounted on an inner side of each rocker arm, the eccentric wheel is mounted on an inner side of each fourth bearing, the eccentric wheels are mounted on the second power input shaft, and the second power input shaft is connected to the first belt pulley;

the second belt pulley is connected to the shaking device;

the third belt pulley is connected to the crank and connecting rod mechanism.

12. The harvester according to claim 8, wherein the crank and connecting rod mechanism comprises a second crank, a connecting rod, and a rocking bar, wherein a first end of the second crank is connected to the first power input shaft, a second end of the second crank is hinged to a first end of the connecting rod, a second end of the connecting rod is hinged to a first end of the rocking bar, and a second end of the rocking bar is connected to the throwing rod.

13. The harvester according to claim 12, wherein the connecting rod is a telescopic connecting rod.

14. The harvester according to claim 8, wherein the shaking plate forms an angle of 3°-6° with the horizontal plane.

15. The harvester according to claim 8, wherein a canvas is mounted between the first frame plate and the second frame plate.

* * * * *